(12) United States Patent
Li et al.

(10) Patent No.: US 12,731,265 B2
(45) Date of Patent: Sep. 8, 2026

(54) SYSTEM AND METHOD FOR PROPOSAL-FREE AND CLUSTER-FREE PANOPTIC SEGMENTATION SYSTEM OF POINT CLOUDS

(71) Applicant: HUAWEI TECHNOLOGIES CO., LTD., Shenzhen (CN)

(72) Inventors: Thomas Enxu Li, Mississauga (CA); Ryan Razani, Toronto (CA); Bingbing Liu, Markham (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 300 days.

(21) Appl. No.: 18/598,553

(22) Filed: Mar. 7, 2024

(65) Prior Publication Data

US 2024/0212164 A1 Jun. 27, 2024

Related U.S. Application Data

(63) Continuation of application No. PCT/CN2022/117761, filed on Sep. 8, 2022.

(60) Provisional application No. 63/241,986, filed on Sep. 8, 2021.

(51) Int. Cl.

| | |
|---|---|
| ***G06T 7/12*** | (2017.01) |
| ***G06T 3/40*** | (2006.01) |
| ***G06T 17/00*** | (2006.01) |
| ***G06V 10/44*** | (2022.01) |
| ***G06V 10/771*** | (2022.01) |
| ***G06V 20/70*** | (2022.01) |

(52) U.S. Cl.

CPC .................. *G06T 7/12* (2017.01); *G06T 3/40* (2013.01); *G06T 17/00* (2013.01); *G06V 10/44* (2022.01); *G06V 10/771* (2022.01); *G06V 20/70* (2022.01)

(58) Field of Classification Search

None

See application file for complete search history.

(56) References Cited

U.S. PATENT DOCUMENTS

2022/0319016 A1* 10/2022 Graber ...................... G06T 7/55
2023/0072731 A1* 3/2023 Li ......................... G01S 7/4808

* cited by examiner

*Primary Examiner* — Leon Flores

(57) ABSTRACT

Systems and methods for panoptic segmentation of a point cloud are provided. A point cloud is projected into a range image. Features are extracted from the range image and generating a feature map from the extracted features. The feature map is downsampled and the features are scaled during downsampling using local geometry. Features are extracted from the downsampled feature map. The point cloud is semantically segmented at least partially based on the features extracted. Instances in the point cloud are segmented at least partially based on the features extracted.

20 Claims, 14 Drawing Sheets

Pillar embedding

Ground truth instance label

Voxel embedding

Ground truth instance label 7 8 9

Voxel embedding

SYSTEM AND METHOD FOR PROPOSAL-FREE AND CLUSTER-FREE PANOPTIC SEGMENTATION SYSTEM OF POINT CLOUDS

CROSS-REFERENCE TO RELATED APPLICATIONS

This application is a continuation of International Patent Application No. PCT/CN2022/117761, filed on Sep. 8, 2022, which claims the benefit of U.S. Provisional Application No. 63/241,986 filed on Sep. 8, 2021, the entire contents of both which are incorporated herein by reference.

TECHNICAL FIELD

The present application generally relates to systems and methods for proposal-free and cluster-free panoptic segmentation of point clouds, and in particular systems and methods for proposal-free and cluster-free panoptic segmentation of point clouds.

BACKGROUND

Scene understanding, otherwise referred to as perception, is one of the primary tasks for autonomous driving, robotics, and surveillance systems. Light Detection and Ranging (LIDAR) sensors are generally used for capturing a scene (i.e., an environment) of a vehicle, robot, or surveillance system. A LIDAR sensor is an effective sensor for capturing a scene because of its active sensing nature and its high resolution sensor readings.

A LIDAR sensor generates point clouds where each point cloud represents a three-dimensional (3D) environment (also called a "scene") scanned by the LIDAR sensor. A single scanning pass performed by the LIDAR sensor generates a "frame" of point cloud (referred to hereinafter as a "point cloud frame"), consisting of a set of points from which light is reflected from one or more points in space, within a time period representing the time it takes the LIDAR sensor to perform one scanning pass. Some LIDAR sensors, such as spinning scanning LIDAR sensors, includes a laser array that emits light in an arc and the LIDAR sensor rotates around a single location to generate a point cloud frame; others LIDAR sensors, such as solid-state LIDAR sensors, include a laser array that emits light from one or more locations and integrate reflected light detected from each location together to form a point cloud frame. Each laser in the laser array is used to generate multiple points per scanning pass, and each point in a point cloud frame corresponds to an object reflecting light emitted by a laser at a point in space in the environment. Each point is typically stored as a set of spatial coordinates (X, Y, Z) as well as other data indicating values such as intensity (i.e. the degree of reflectivity of the object reflecting the laser). The other data may be represented as an array of values in some implementations. In a scanning spinning LIDAR sensor, the Z axis of the point cloud frame is typically defined by the axis of rotation of the LIDAR sensor, roughly orthogonal to an azimuth direction of each laser in most cases (although some LIDAR sensor may angle some of the lasers slightly up or down relative to the plane orthogonal to the axis of rotation).

Point cloud frames may also be generated by other scanning technologies, such as high-definition radar or depth cameras, and theoretically any technology using scanning beams of energy, such as electromagnetic or sonic energy, could be used to generate point cloud frames. Whereas examples will be described herein with reference to LIDAR sensors, it will be appreciated that other sensor technologies which generate point cloud frames could be used in some embodiments.

A LIDAR sensor can be one of the primary sensors used in autonomous vehicles or robots to sense an environment (i.e. scene) surrounding the autonomous vehicle. An autonomous vehicle generally includes an automated driving system (ADS) or advanced driver-assistance system (ADAS). The ADS or the ADAS includes a perception system that processes point clouds to generate predictions which are usable by other sub systems of the ADS or ADAS for localization of the autonomous vehicle, path planning for the autonomous vehicle, motion planning for the autonomous vehicle, or trajectory generation for the autonomous vehicle.

Both instance level of object detection (referred to as instance segmentation) and semantic segmentation are two key aspects of understanding a scene (i.e. perception). More specifically, compared with detecting instances of object, semantic segmentation is the process of partitioning an image, or a point cloud obtained from a LIDAR, or alternative visual representation into multiple segments. Each segment is assigned a label or tag which is representative of the category that segment belongs to. Thus, semantic segmentation of LIDAR point clouds is an attempt to predict the category or class label or tag for each point of a point cloud. In the context of ADS or the ADAS, however, object detection or semantic segmentation is not totally independent. As a class label or tag for an object of interest can be generated by semantic segmentation, semantic segmentation can act as an intermediate step to enhance downstream perception tasks such as object detection and tracking.

Panoptic segmentation involves performing both instance segmentation (e.g. which individual object segmentation mask does a point belong to) and sematic segmentation (which semantic category does a point belong to). The purpose of panoptic segmentation is to identify class labels for points in "stuff" classes and both class labels and instance identifiers for points in the "thing" classes. "Stuff" are defined as a class that includes uncountable objects, such as vegetation, roads, buildings, sidewalks, etc. "Things" are defined as a class that includes "countable objects", such as pedestrians, other vehicles (or robots), and bicycles, motorcycles, etc.

Generally, there are two different approaches for performing panoptic segmentation. The first approach for performing panoptic segmentation, referred to as a top-down (or proposal-based) approach, is a two-stage approach which starts with foreground object proposal generation, using an object detector, which detects instances of an objects in a point cloud that belong to one of the foreground classes, such as cars, trucks, and pedestrians, and generates a center point or bounding box for each instance of object detected. Then, the object proposals are further processed to extract instance information, which is fused with background semantic information. An example of a top-down approach for performing panoptic segmentation is described in Li, Yanwei, et al., "Attention-guided unified network for panoptic segmentation," 2019 IEEE Conference on Computer Vision and Pattern Recognition (CVPR), 2019, and illustrated in FIG. 1A.

A second approach for performing panoptic segmentation, referred to as a bottom-up (proposal-free) approach performs semantic segmentation and then groups the 'thing' points into clusters, using a clustering method as a further processing step, to achieve instance segmentation. Examples of a bottom-up approach is described in A. Milioto, J.

Behley, C. McCool and C. Stachniss, "LiDAR Panoptic Segmentation for Autonomous Driving," 2020 IEEE/RSJ International Conference on Intelligent Robots and Systems (IROS), 2020, pp. 8505-8512, doi: 10.1109/IROS45743.2020.9340837, illustrated in FIG. 1B, and Hong, Fangzhou, et al. "LiDAR-based Panoptic Segmentation via Dynamic Shifting Network.", 2021 IEEE Conference on Computer Vision and Pattern Recognition (CVPR), 2021.

The top-down and bottom-up approaches for panoptic segmentation of point clouds described above include a semantic segmentation network and an instance segmentation network. The top-down and bottom-up approaches for panoptic segmentation are computationally inefficient as they require significant memory and computing resources to perform panoptic segmentation of point clouds. Further, because the above-noted top-down approaches for panoptic segmentation utilize an object detector which learns instance-level information separately from semantic segmentation, these approaches generate redundant information. Because bottom-up approaches require clustering methods to be performed, which is an additional processing step, bottom-up approaches require a significant amount of time to execute (i.e. are time-consuming).

Accordingly, there is a need for improved systems and methods for proposal-free and cluster-free panoptic segmentation of point clouds.

SUMMARY

The present disclosure describes systems and methods which provide one or more efficient techniques to perform In accordance with an aspect of the present disclosure, there is provided a computer-implemented method for panoptic segmentation of a point cloud, comprising: projecting a point cloud into a range image; extracting features from the range image and generating a feature map from the extracted features; downsampling the feature map and scaling the features during downsampling using local geometry; extracting features from the downsampled feature map; semantically segmenting the point cloud at least partially based on the features extracted; and segmenting instances in the point cloud at least partially based on the features extracted.

The downsampling and the extracting features from the downsampled feature map can be repeated.

The extracted features can be grouped into channels.

The computer-implemented method can further comprise: weighing the features in each of the channels differently for semantic segmentation and instance segmentation.

Points in the point cloud can be assigned semantic labels and instance labels during the semantic segmenting and the instance segmenting, respectively, and the semantic labels and the instance labels can be projected onto the point cloud.

The computer-implemented method can further comprise: upsampling the downsampled feature map to a desired resolution; and processing combined features of the feature map and the downsampled feature map at the desired resolution before the semantically segmenting and the segmenting instances.

The desired resolution can be the resolution of the feature map.

The features of the feature map and the downsampled feature map are assigned to feature channels.

The processing can include: semantically segmenting the point cloud using a first set of weights for the feature channels; and segmenting instances in the point cloud using a second set of weights for the feature channels, the second set of weights differing from the first set of weights.

The computer-implemented method can further comprise: dividing foreground points in the point cloud into discrete spaces; determining a center of mass for each of the discrete spaces based on a position of the foreground points in the discrete space; determining a distance between the centers of mass of pairs of discrete spaces; calculating a score for each of the pairs of discrete spaces at least partially based on the distance between the centers of mass of the discrete spaces in the pair; and grouping the foreground points in each discrete space into objects based on the score for each of the pairs of discrete spaces.

The computer-implemented method can further comprise: determining the position for each foreground point in the point cloud based on a shifted position from a centroid of an instance to which the point belongs.

The discrete spaces can be voxels.

The voxels can be unlimited in length along a dimension.

The computer-implemented method can further comprise: constructing a pairwise distance matrix wherein each matrix element represents the distance between one of the pairs of discrete spaces.

The score, $D_{ij}$, can be calculated as:

$$D_{ij} = e^{-a\|C_{D,i}-C_{D,j}\|_2},$$

where $\|C_{D,i}-C_{D,j}\|_2$ is the distance between the discrete spaces $C_{D,i}$ and $C_{D,j}$, and a is a tunable hyperparameter.

In accordance with another aspect, there is provided a computing system for panoptic segmentation of a point cloud, the computing system comprising: a processor; a memory storing machine-executable instructions that, when executed by the processor, cause the processor to: project a point cloud into a range image; extract features from the range image and generating a feature map from the extracted features; downsample the feature map and scaling the features during downsampling using local geometry; extract features from the downsampled feature map; semantically segment the point cloud at least partially based on the features extracted; and segment instances in the point cloud at least partially based on the features extracted.

The machine-executable instructions, when executed by the processor, can cause the processor to repeat the downsampling and the extraction of features from the downsampled feature map.

The extracted features can be grouped into channels.

The machine-executable instructions, when executed by the processor, can cause the processor to: weigh the features in each of the channels differently for semantic segmentation and instance segmentation.

Points in the point cloud can be assigned semantic labels and instance labels during the semantic segmenting and the instance segmenting, respectively, and the semantic labels and the instance labels can be projected onto the point cloud.

The machine-executable instructions, when executed by the processor, can cause the processor to: upsample the downsampled feature map to a desired resolution; and process combined features of the feature map and the downsampled feature map at the desired resolution before the semantically segmenting and the segmenting instances.

The desired resolution can be the resolution of the feature map.

The features of the feature map and the downsampled feature map can be assigned to feature channels.

The machine-executable instructions, when executed by the processor, can cause the processor to, during the processing: semantically segment the point cloud using a first set of weights for the feature channels; and segment instances in the point cloud using a second set of weights for the feature channels, the second set of weights differing from the first set of weights.

The computing system of any of the previous claims, can further comprise: dividing foreground points in the point cloud into discrete spaces; determining a center of mass for each of the discrete spaces based on a position of the foreground points in the discrete space; determining a distance between the centers of mass of pairs of discrete spaces; calculating a score for each of the pairs of discrete spaces at least partially based on the distance between the centers of mass of the discrete spaces in the pair; and grouping the foreground points in each discrete space into objects based on the score for each of the pairs of discrete spaces.

The machine-executable instructions, when executed by the processor, can cause the processor to: determine the position for each foreground point in the point cloud based on a shifted position from a centroid of an instance to which the point belongs.

The discrete spaces are voxels.

The voxels can be unlimited in length along a dimension.

The machine-executable instructions, when executed by the processor, can cause the processor to: construct a pairwise distance matrix wherein each matrix element represents the distance between one of the pairs of discrete spaces.

The score, $D_{ij}$, can be calculated as:

$$D_{ij} = e^{-a\|C_{D,i}-C_{D,j}\|_2},$$

where $\|C_{D,i}-C_{D,j}\|_2$ is the distance between the discrete spaces $C_{D,i}$ and $C_{D,j}$, and a is a tunable hyperparameter.

In accordance with a further aspect of the present disclosure, there is provided a non-transitory machine-readable medium having tangibly stored thereon executable instructions for execution by one or more processors, wherein the executable instructions, in response to execution by the one or more processors, cause the one or more processors to: project a point cloud into a range image; extract features from the range image and generating a feature map from the extracted features; downsample the feature map and scaling the features during downsampling using local geometry; extract features from the downsampled feature map; semantically segment the point cloud at least partially based on the features extracted; and segment instances in the point cloud at least partially based on the features extracted.

The machine-executable instructions, when executed by the processor, can cause the processor to repeat the downsampling and the extraction of features from the downsampled feature map.

The extracted features can be grouped into channels.

The machine-executable instructions, when executed by the processor, can cause the processor to: weigh the features in each of the channels differently for semantic segmentation and instance segmentation.

Points in the point cloud can be assigned semantic labels and instance labels during the semantic segmenting and the instance segmenting, respectively, and wherein the semantic labels and the instance labels are projected onto the point cloud.

The machine-executable instructions, when executed by the processor, can cause the processor to: upsample the downsampled feature map to a desired resolution; and process combined features of the feature map and the downsampled feature map at the desired resolution before the semantically segmenting and the segmenting instances.

The desired resolution can be the resolution of the feature map.

The features of the feature map and the downsampled feature map can be assigned to feature channels.

The machine-executable instructions, when executed by the processor, can cause the processor to, during the processing: semantically segment the point cloud using a first set of weights for the feature channels; and segment instances in the point cloud using a second set of weights for the feature channels, the second set of weights differing from the first set of weights.

The non-transitory machine-readable medium can further comprise: dividing foreground points in the point cloud into discrete spaces; determining a center of mass for each of the discrete spaces based on a position of the foreground points in the discrete space; determining a distance between the centers of mass of pairs of discrete spaces; calculating a score for each of the pairs of discrete spaces at least partially based on the distance between the centers of mass of the discrete spaces in the pair; and grouping the foreground points in each discrete space into objects based on the score for each of the pairs of discrete spaces.

The machine-executable instructions, when executed by the processor, can cause the processor to: determine the position for each foreground point in the point cloud based on a shifted position from a centroid of an instance to which the point belongs.

The discrete spaces can be voxels.

The voxels can be unlimited in length along a dimension.

The machine-executable instructions, when executed by the processor, can cause the processor to: construct a pairwise distance matrix wherein each matrix element represents the distance between one of the pairs of discrete spaces.

The score, $D_{ij}$, can be calculated as:

$$D_{ij} = e^{-a\|C_{D,i}-C_{D,j}\|_2},$$

where $\|C_{D,i}-C_{D,j}\|_2$ is the distance between the discrete spaces $C_{D,i}$ and $C_{D,j}$, and a is a tunable hyperparameter.

In another aspect of the present disclosure, there is provided a computer-implemented method for panoptic segmentation of a point cloud, comprising: receiving at least two feature maps of different resolutions generated from a point cloud; upsampling a subset of the at least two feature maps to a desired resolution; and processing combined features of the at least two feature maps at the desired resolution to perform segmentation of the point cloud.

The desired resolution can be the highest resolution of the at least two feature maps.

The features of the at least two feature maps can be assigned to feature channels.

The processing can include: semantically segmenting the point cloud using a first set of weights for the feature channels; and segmenting instances in the point cloud using a second set of weights for the feature channels, the second set of weights differing from the first set of weights.

In still another aspect of the present disclosure, there is provided a computing system for panoptic segmentation of a point cloud, the computing system comprising: a processor; a memory storing machine-executable instructions that, when executed by the processor, cause the processor to:

receive at least two feature maps of different resolutions generated from a point cloud; upsample a subset of the at least two feature maps to a desired resolution; and process combined features of the at least two feature maps at the desired resolution to perform segmentation of the point cloud.

The desired resolution can be the highest resolution of the at least two feature maps.

The features of the at least two feature maps can be assigned to feature channels.

The machine-executable instructions, when executed by the processor, can cause the processor to, during the processing: semantically segment the point cloud using a first set of weights for the feature channels; and segment instances in the point cloud using a second set of weights for the feature channels, the second set of weights differing from the first set of weights.

In a further aspect of the present disclosure, there is provided a non-transitory machine-readable medium having tangibly stored thereon executable instructions for execution by one or more processors, wherein the executable instructions, in response to execution by the one or more processors, cause the one or more processors to: receive at least two feature maps of different resolutions generated from a point cloud; upsample a subset of the at least two feature maps to a desired resolution; and process combined features of the at least two feature maps at the desired resolution to perform segmentation of the point cloud.

The desired resolution can be the highest resolution of the at least two feature maps.

The features of the at least two feature maps can be assigned to feature channels.

The machine-executable instructions, when executed by the processor, can cause the processor to, during the processing: semantically segment the point cloud using a first set of weights for the feature channels; and segment instances in the point cloud using a second set of weights for the feature channels, the second set of weights differing from the first set of weights.

In still another aspect of the present disclosure, there is provided a computer-implemented method for panoptic segmentation of a point cloud, comprising: dividing foreground points in a point cloud into discrete spaces; determining a center of mass for each of the discrete spaces based on a position of the foreground points in the discrete space; determining a distance between the centers of mass of pairs of discrete spaces; calculating a score for each of the pairs of discrete spaces at least partially based on the distance between the centers of mass of the discrete spaces in the pair; and grouping the foreground points in each discrete space into objects based on the score for each of the pairs of discrete spaces.

The computer-implemented method can further comprise: determining the position for each foreground point in the point cloud based on a shifted position from a centroid of an instance to which the point belongs.

The discrete spaces can be voxels.

The voxels can be unlimited in length along a dimension.

The computer-implemented method can further comprise: constructing a pairwise distance matrix wherein each matrix element represents the distance between one of the pairs of discrete spaces.

The score, $D_{ij}$, can be calculated as:

$$D_{ij} = e^{-a\|C_{D,i}-C_{D,j}\|_2},$$

where $\|C_{D,i}-C_{D,j}\|_2$ is the distance between the discrete spaces $C_{D,i}$ and $C_{D,j}$, and a is a tunable hyperparameter.

In still yet another aspect of the present disclosure, there is provided a computing system for panoptic segmentation of a point cloud, the computing system comprising: a processor; a memory storing machine-executable instructions that, when executed by the processor, cause the processor to: divide foreground points in a point cloud into discrete spaces; determine a center of mass for each of the discrete spaces based on a position of the foreground points in the discrete space; determine a distance between the centers of mass of pairs of discrete spaces; calculate a score for each of the pairs of discrete spaces at least partially based on the distance between the centers of mass of the discrete spaces in the pair; and group the foreground points in each discrete space into objects based on the score for each of the pairs of discrete spaces.

The machine-executable instructions, when executed by the processor, can cause the processor to: determine the position for each foreground point in the point cloud based on a shifted position from a centroid of an instance to which the point belongs.

The discrete spaces can be voxels.

The voxels can be unlimited in length along a dimension.

The machine-executable instructions, when executed by the processor, can cause the processor to: construct a pairwise distance matrix wherein each matrix element represents the distance between one of the pairs of discrete spaces.

The score, $D_{ij}$, can be calculated as:

$$D_{ij} = e^{-a\|C_{D,i}-C_{D,j}\|_2},$$

where $\|C_{D,i}-C_{D,j}\|_2$ is the distance between the discrete spaces $C_{D,i}$ and $C_{D,j}$, and a is a tunable hyperparameter.

In still a further aspect of the present disclosure, there is provided a non-transitory machine-readable medium having tangibly stored thereon executable instructions for execution by one or more processors, wherein the executable instructions, in response to execution by the one or more processors, cause the one or more processors to: divide foreground points in a point cloud into discrete spaces; determine a center of mass for each of the discrete spaces based on a position of the foreground points in the discrete space; determine a distance between the centers of mass of pairs of discrete spaces; calculate a score for each of the pairs of discrete spaces at least partially based on the distance between the centers of mass of the discrete spaces in the pair; and group the foreground points in each discrete space into objects based on the score for each of the pairs of discrete spaces.

The machine-executable instructions, when executed by the processor, can cause the processor to: determine the position for each foreground point in the point cloud based on a shifted position from a centroid of an instance to which the point belongs.

The discrete spaces can be voxels.

The voxels can be unlimited in length along a dimension.

The machine-executable instructions, when executed by the processor, can cause the processor to: construct a pairwise distance matrix wherein each matrix element represents the distance between one of the pairs of discrete spaces.

The score, $D_{ij}$, can be calculated as:

$$D_{ij} = e^{-a\|C_{D,i}-C_{D,j}\|_2},$$

where $\|C_{D,i}-C_{D,j}\|_2$ is the distance between the discrete spaces $C_{D,i}$ and $C_{D,j}$, and a is a tunable hyperparameter.

Other aspects and features of the present disclosure will become apparent to those of ordinary skill in the art upon review of the following description of specific implementations of the application in conjunction with the accompanying figures.

BRIEF DESCRIPTION OF THE DRAWINGS

Reference will now be made, by way of example, to the accompanying drawings which show example embodiments of the present application.

Similar reference numerals may have been used in different figures to denote similar components. Unless otherwise specifically noted, articles depicted in the drawings are not necessarily drawn to scale.

DETAILED DESCRIPTION OF EXAMPLE EMBODIMENTS

Figure 1A:
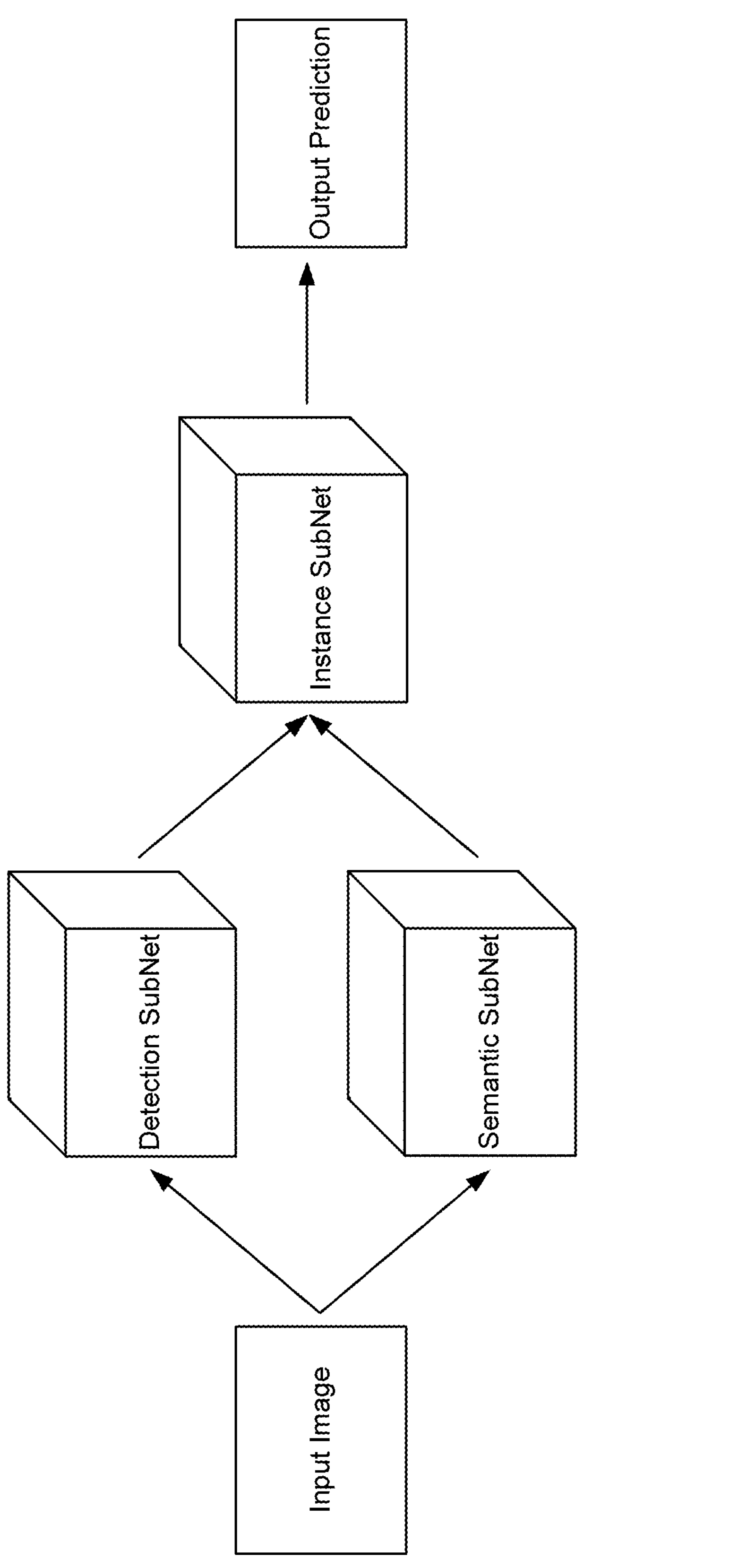
FIG. 1A is block diagram of a prior art system for panoptic segmentation.
Figure 1B:
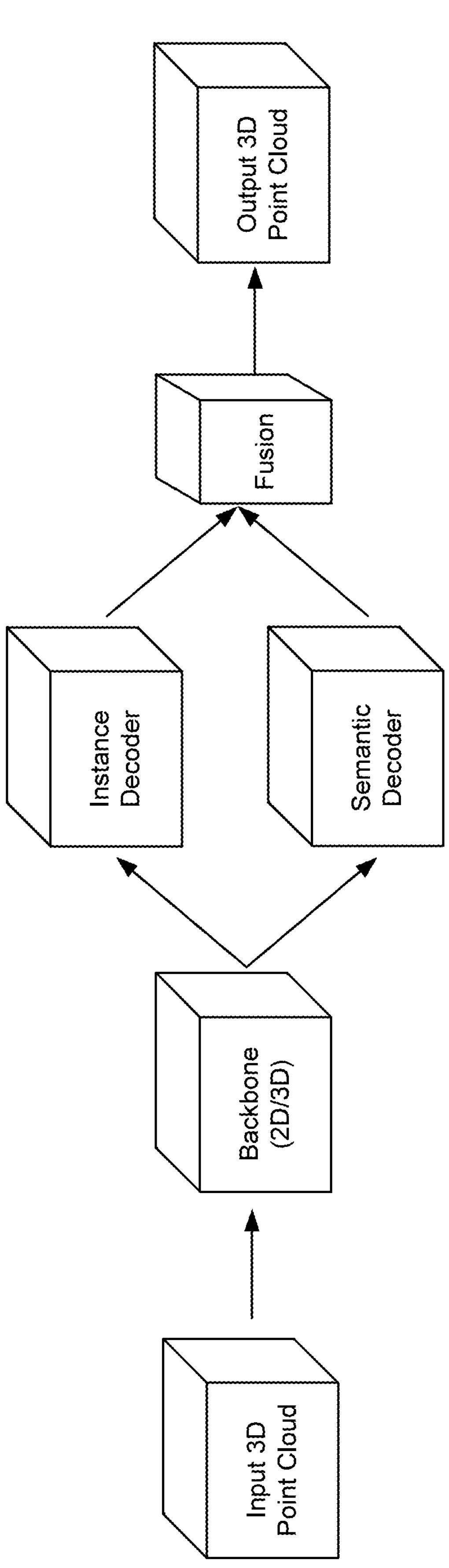
FIG. 1B is block diagram of another prior art system for panoptic segmentation.

The present disclosure is made with reference to the accompanying drawings, in which embodiments are shown. However, many different embodiments may be used, and thus the description should not be construed as limited to the embodiments set forth herein. Rather, these embodiments are provided so that this application will be thorough and complete. Wherever possible, the same reference numbers are used in the drawings and the following description to refer to the same elements, and prime notation is used to indicate similar elements, operations or steps in alternative embodiments. Separate boxes or illustrated separation of functional elements of illustrated systems and devices does not necessarily require physical separation of such functions, as communication between such elements may occur by way of messaging, function calls, shared memory space, and so on, without any such physical separation. As such, functions need not be implemented in physically or logically separated platforms, although such functions are illustrated separately for ease of explanation herein. Different devices may have different designs, such that although some devices implement some functions in fixed function hardware, other devices may implement such functions in a programmable processor with code obtained from a machine-readable medium. Lastly, elements referred to in the singular may be plural and vice versa, except wherein indicated otherwise either explicitly or inherently by context.

Known systems for panoptic segmentation includes a semantic segmentation network which processes a point cloud to learn semantic information in the point cloud and an instance segmentation network processes the point cloud to learn instance information in the point cloud. Generally, in known systems for panoptic segmentation, the instance segmentation network includes an object detector which includes a region proposal network (RPN) which generates a center-point or bounding box for each instance of each foreground object detected by the object detector in the point cloud (e.g., objects that belong to one of the foreground classes, such as cars, trucks, and pedestrians). One drawback to known systems for panoptic segmentation is that object detector included in the instance segmentation process a point cloud independent from the semantic segmentation network, which may lead to redundant processing and computations being performed by the semantic segmentation network and the instance segmentation network.

Further, known systems for proposal-free panoptic segmentation usually segment instances using different clustering methods (e.g., HDBSCAN, meanshift) which leads to two significant drawbacks. The first drawback of these clustering methods is that these methods require more than 100 milliseconds to execute during inference, unable to meet what is considered a real-time performance. The second drawback of these clustering methods is that these methods are unable to directly optimize the segmentation metrics, such as IoU, PQ, SQ.

The present disclosure relates to methods and systems for proposal-free and cluster-free panoptic segmentation of point clouds. The system for proposal-free and cluster-free panoptic segmentation of point clouds (referred to herein a CPSNet) is more computationally efficient (that is, it uses less computing and memory resources when performing panoptic segmentation of point clouds) than known two-stage panoptic segmentation systems, which include a detection network for capturing instance information in point clouds, and clustering-based panoptic segmentation system, which requires additional processing steps in the form of a clustering method.

Figure 2:
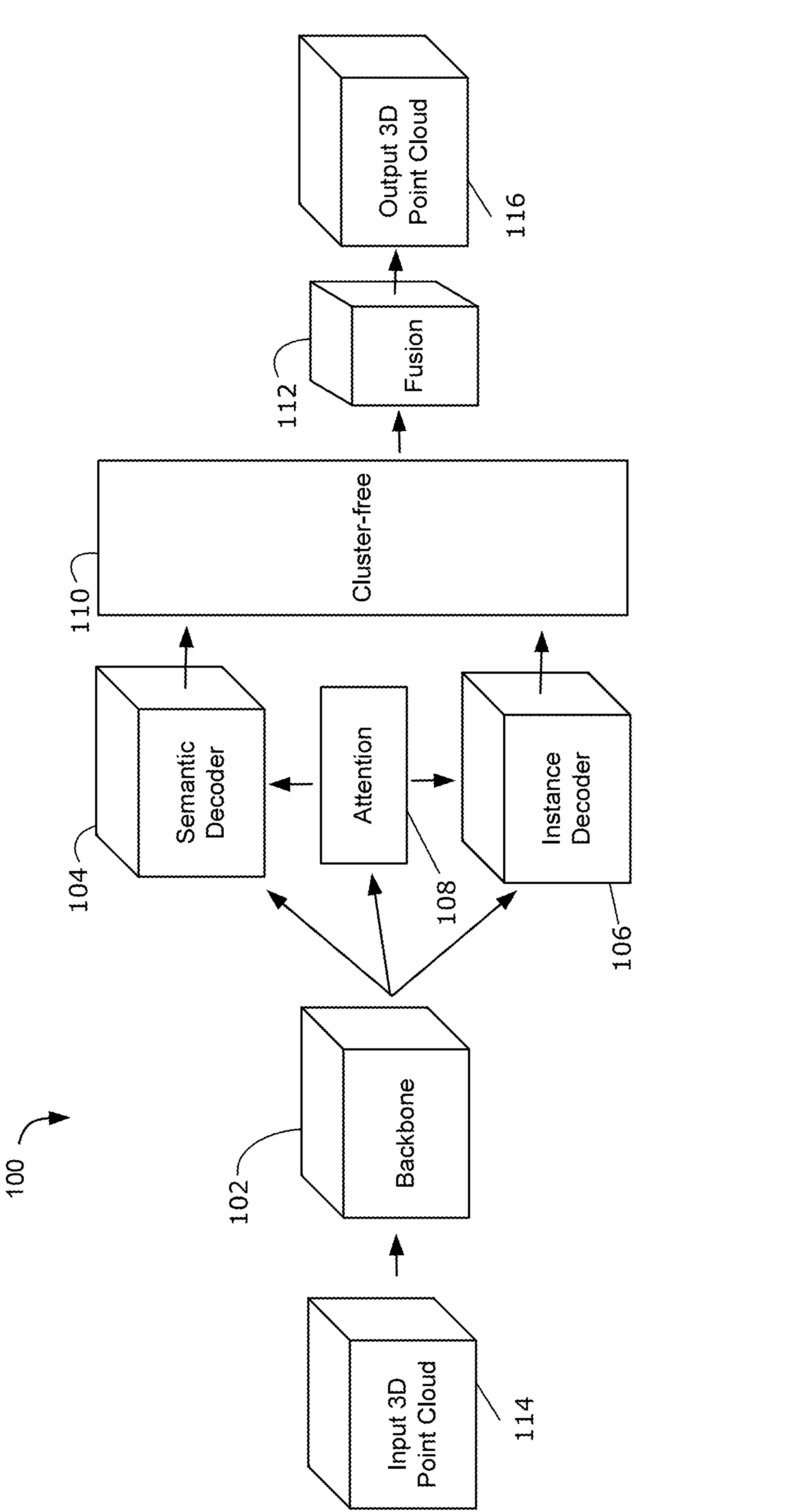
FIG. 2 is a block diagram of a system for proposal-free and cluster-free panoptic segmentation of point clouds according to an example embodiment of the present disclosure.

Referring to FIG. 2, an embodiment of a system 100 for proposal-free and cluster-free panoptic segmentation of point clouds is shown. The system 100 includes a backbone 102, a semantic decoder 104, an instance decoder 106, a hierarchical attention module 108, a cluster-free instance segmentation module 110, and a fusion module 112 (otherwise referred to as a post-processing module 112).

The backbone 102 receives a point cloud 114, for example, a three-dimensional point cloud, projects the points in the point cloud into a range image r, processes each point on the range image r to generate feature maps of different resolutions, and outputs the feature maps of different resolutions to the hierarchical attention module 108. The backbone also outputs a feature map of lowest resolution to each of the semantic decoder 104 and the instance decoder 106. The hierarchical attention module 108 receives the feature maps of different resolutions from the backbone 102 and scales the features in the feature maps of different resolutions to generate two different feature maps. The hierarchical attention module 108 provides a first feature map of the two different feature maps to the semantic decoder 104 and the second feature map of the two different feature maps to the instance decoder 106. The semantic decoder 104 receives a lowest resolution feature map of the different resolution feature maps generated by the backbone 102 and the first feature map from the hierarchical attention module 108 and processes the lowest resolution feature map and the first feature map to predict a semantic label for every point in the range image r. The instance decoder 106 receives a lowest resolution feature map of the different resolution feature maps generated by the backbone 102 and the second feature map from the hierarchical attention module 108 and processes the lowest resolution feature map and the second feature map to predict a two-dimensional (2D) offset for every foreground point in the range image r. The cluster-free instance segmentation module 110 receives the predicted semantic labels, 2D offsets, as well as the xy coordinates of each point as observed in the point cloud, and outputs instance labels. The fusion module 112 receives the instance labels and semantic labels from the cluster-free instance segmentation module 110 and re-projects the results from the dimension of a range image back to a point cloud.

Figure 3:
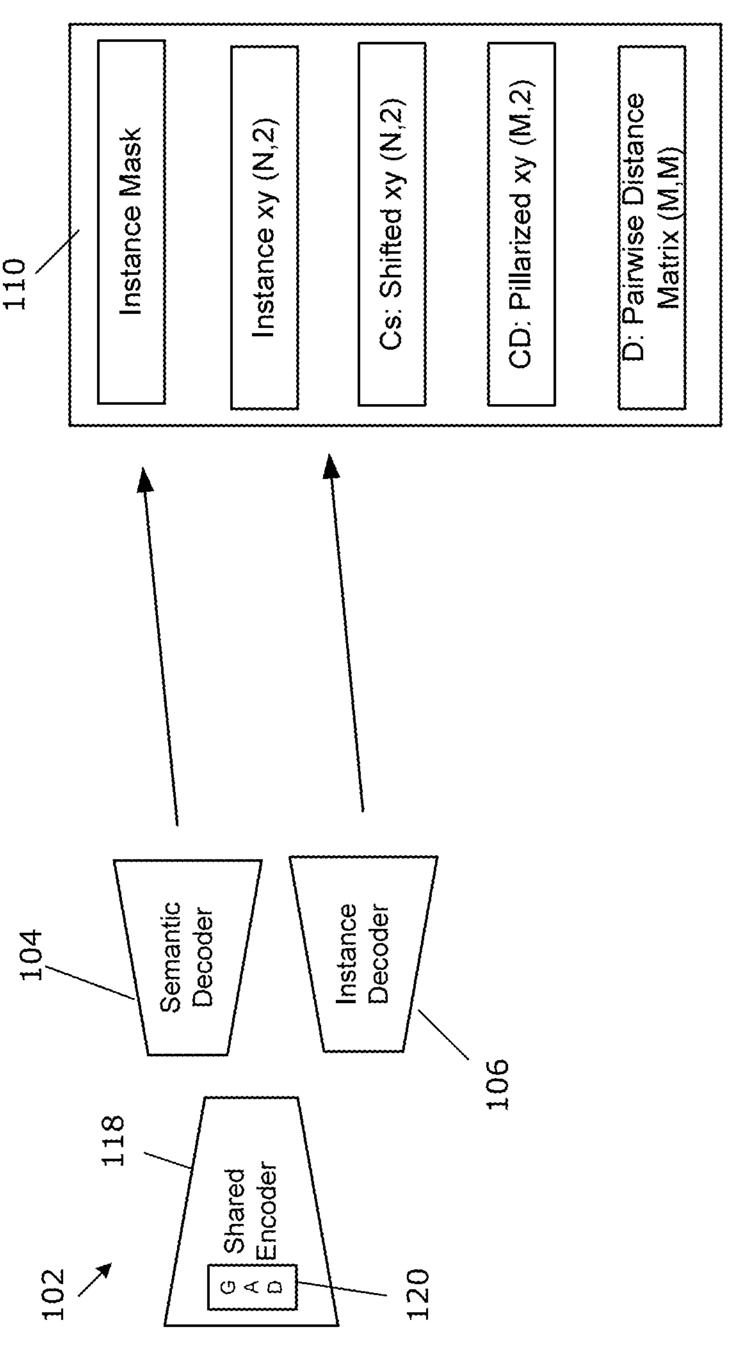
FIG. 3 is a detailed block diagram of various components of the backbone and cluster-free instance segmentation module of FIG. 2.
Figure 4A:
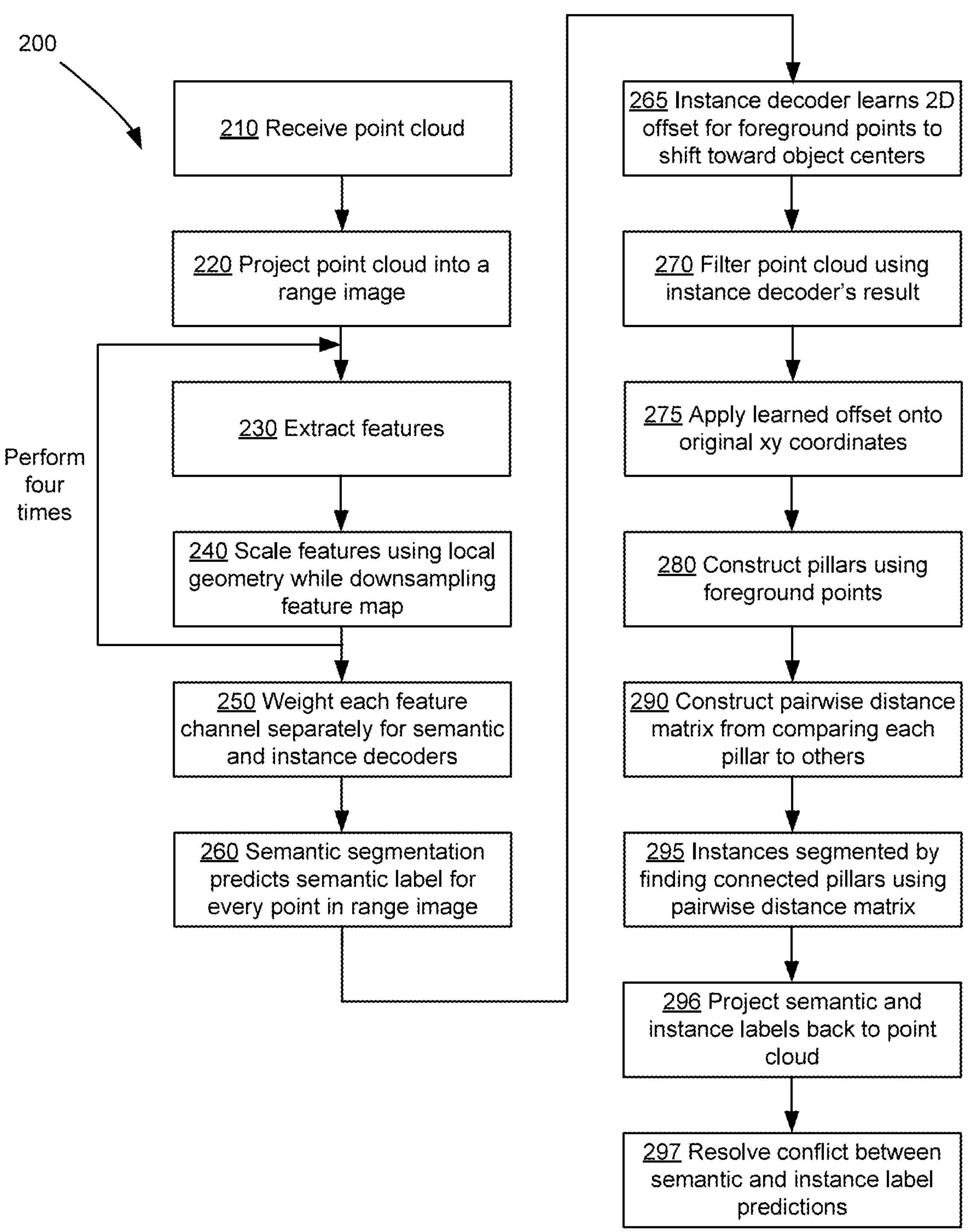
FIGS. 4A to 4C show a method for proposal-free and cluster-free panoptic segmentation in accordance with an example embodiment.
Figure 4B:
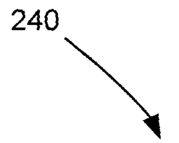
Figure 4B:
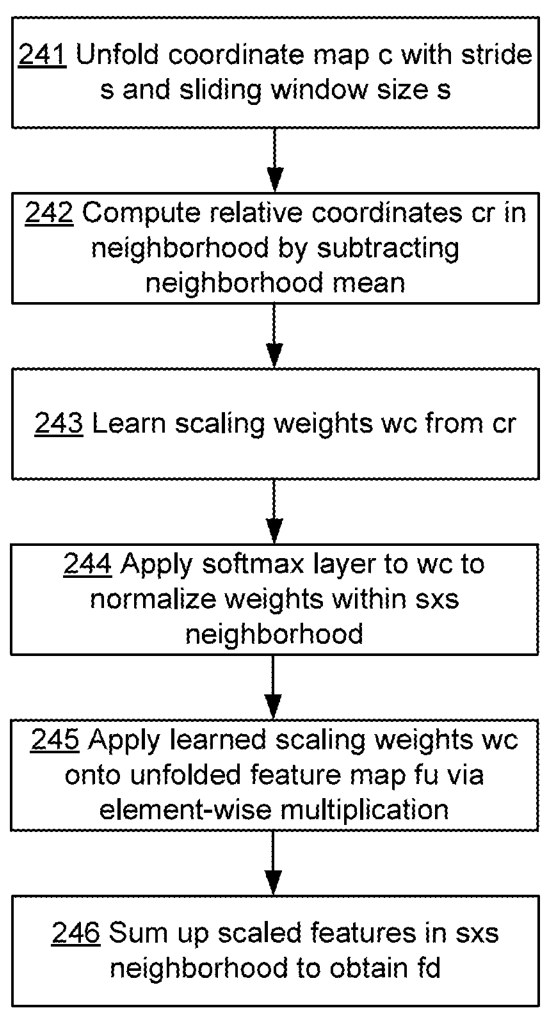
Figure 4C:
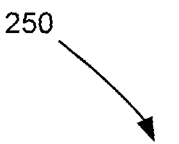
Figure 4C:
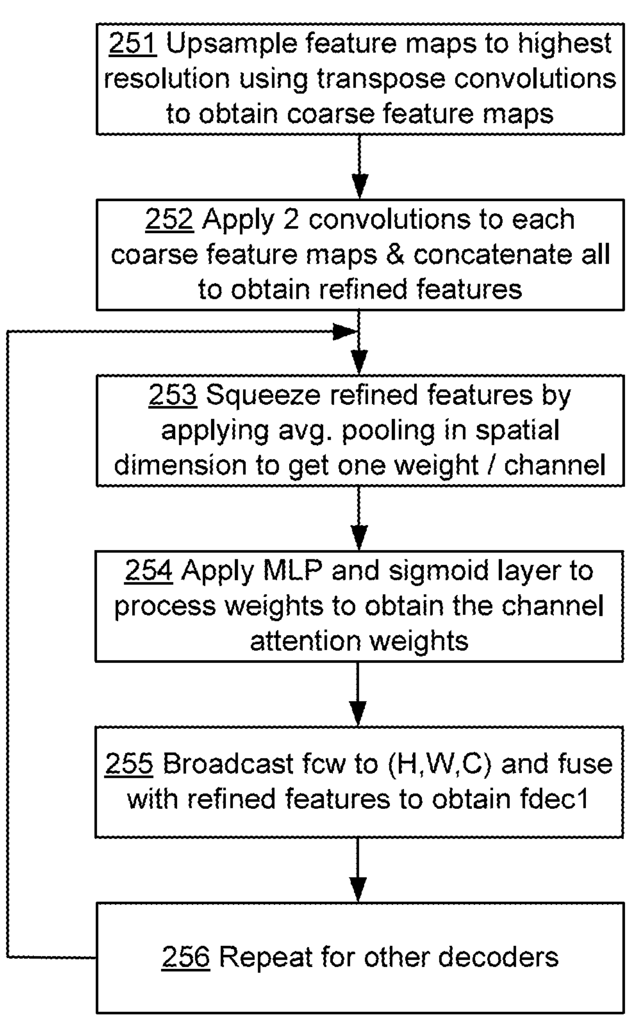

Referring to FIG. 3, the backbone 102 includes a pre-processing module (not shown), an encoder 118 and a geometry-downsampling module 120. The pre-processing module (not shown) receives the point cloud 114 and projects the point cloud 114 into a range image r of shape (H, W, 5) using spherical transformation with its Cartesian coordinates (x,y,z), depth, and intensity as features.

The encoder 118 is a "shared encoder" as it is coupled to both the semantic decoder 104 and the instance decoder 106. The encoder 118 receives the range image r from the pre-processing module (not shown)) and extracts features from the range image r and generates feature maps of different resolutions. A geometry-aware downsampling module 120 of the encoder 118 is configured to learn a local geometry of each of the neighborhood of points (e.g. a point and its nearby points on the range image r).

A method 200 for proposal-free and cluster-free panoptic segmentation of point clouds performed by the system 100 in accordance with an example embodiment will now be described with reference to FIGS. 2 to 4C. A 3D point cloud 114 is received by the backbone 102 (210). The point cloud 114 can be retrieved from memory, received via a network connection, or received in any other suitable manner. The pre-processing module of the backbone 102 projects the point cloud 114 into a range image r of shape (H, W, 5) using spherical transformation with its Cartesian coordinates (x,y, z), depth, and intensity as features. The pre-processing module (not shown) discretizes elevation φ and azimuth θ angles to index (u, v), which positions each point into the range image r. When multiple points in the point cloud 114 collide with the same index (u, v), the point with the closest depth is used. Depth refers to the Euclidean distance of a particular point to the LiDAR sensor which generated the point cloud, where H is a number of beams of light emitted by the LiDAR sensor, and W is the number of points generated for each beam.

Figure 5:
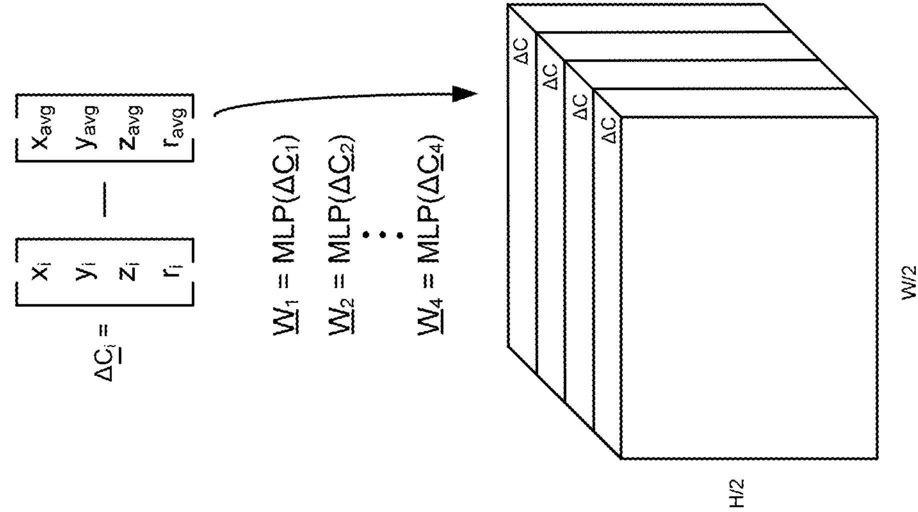
FIG. 5 shows feature maps generated by the encoder of FIG. 2 in accordance with a configuration.

Once the range image r has been generated, the encoder 118 extracts features from the range image r and generates a feature map (230) then scales the features using local geometry while downsampling the feature map (230). These steps are repeated a number of times, four in the presently described embodiment, although other numbers of repetitions can be employed in other embodiments. In an embodiment, the encoder 118 includes a convolutional neural network (CNN) that have multiple convolutional layers, where the first convolution layer of the CNN takes in the range image r, performs dot product between the layer and each neighborhood of points (e.g. a point and its nearby points on the range r) and output a feature map of a reduced resolution. Subsequently, each convolutional layer of the CNN that follows takes in the output of the previous layer generates a feature map of a particular, reduced resolution. For example, as shown in FIG. 5, the CNN of the encoder 118 generates four feature maps of different resolutions, denoted f1, f2, f3, f4.

The geometry-aware downsampling module 120 is disposed between adjacent convolutional layers of the CNN of the encoder 118 and is configured to learn a local geometry of each of the neighborhood of points (e.g. a point and its nearby points on the range image r). The geometry-aware downsampling module 120 scales each feature in a feature map generated by a convolutional layer of the encoder 118 with knowledge of a local geometry while downsampling the feature map. The geometry-aware downsampling module 120 provides the downsampled feature map to the next convolutional layer of the CNN.

A feature map f (H, W, F) generated by a convolutional layer of the encoder 118 and a corresponding coordinate map c (H, W, C) for the feature map are received by the geometry-aware downsampling module 120. The features to fd (H//s, W//s, F) are then downsampled by the geometry-aware downsampling module 120 while learning the local geometry of the neighborhood at the same time, as shown in FIG. 3, where s is the stride and F is the number of feature channels. The geometry-aware downsampling module 120 unfolds the corresponding coordinate map c with a stride of s and a sliding window size of s (241). For instance, if s=2, the corresponding coordinate map will be reshaped in a way that each of the 2×2 neighborhoods are stacked. Thus f (H, W, C) is turned into cu (H/s, W/s, C, $s^2$). From cu, the geometry-aware downsampling module 120 computes the relative coordinates cr in the neighborhood by subtracting itself with the neighborhood mean (242):

$$Cr = cu - cu.mean(dim = 3).$$

The geometry-aware downsampling module 120 learns a set of scaling weights wc (H/s, W/s, F, s^2) from cr (H/s, W/s, C, $s^2$) using a MLP (243). Then a softmax layer is applied on wc to normalize the weights within the s×s neighborhood to sum up to 1 (244). The feature map f(H, W, C) is then unfolded to obtain fu (H/s, W/s, F, $s^2$). The learned scaling weights wc are applied onto the unfolded feature map fu via element-wise multiplication (245):

$$Fu = fu * wc$$

The geometry-aware downsampling module 120 then sums up the scaled features in the s×s neighborhood to obtain fd (H/s, W/s, F) (246).

Figure 6:
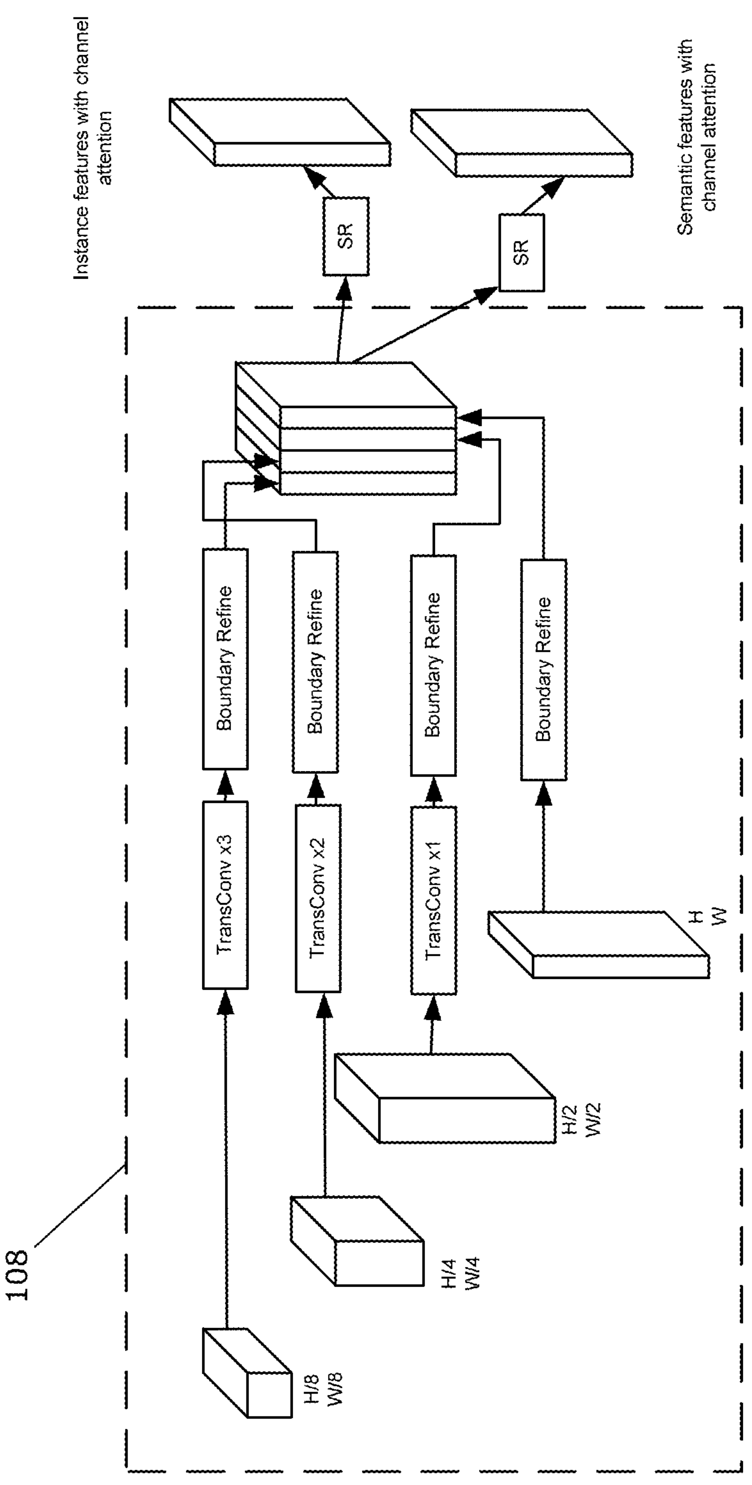
FIG. 6 shows the function of the hierarchical attention module of FIG. 2 in accordance with a configuration.

The hierarchical attention module 108 receives multiple feature maps of different resolutions from the encoder 118, fuses multi-scale features in the multiple feature maps and applies channel-wise attention to generate the first and second feature maps mentioned above for the semantic decoder 104 and the instance decoder 106 (250). FIG. 6 shows a block diagram of the hierarchical attention module 108 according to an embodiment of the present disclosure. In particular, the hierarchical attention module 108 upsamples all feature maps {fs0, fs1, fs2 . . . } to the highest resolution using transpose convolutions to obtained coarse feature maps {fu0, fu1, fu2 . . . } (251). Then, two convolutions are applied with kernel size of 3 and padding of 1 to each of the coarse feature maps to act as a boundary refinement and concatenate all to obtain refined features fr (H, W, C) (252). The refined features fr are squeezed by applying average pooling in the spatial dimension to obtain one weight per channel, fw(1, 1, C) (253). The hierarchical attention module 108 then applies a MLP and sigmoid layer to further process fw to obtain the channel attention weights fcw(1, 1, C) (254). fcw is then broadcast to (H, W, C) by repeating in the spatial dimensions and fuse it with fr by element-wise multiplication to obtain fdec1. Fdec1=fr+fr*fcw (255). The hierarchical attention module 108 repeats 253 to 255 to generate the second feature map for the instance decoder 106.

The semantic decoder 104 receives a lowest resolution feature map of the different resolution feature maps generated by the backbone 102 and the first feature map from the hierarchical attention module 108 and processes the lowest resolution feature map and the first feature map to predict a semantic label for every point in the range image r (260). The instance decoder 106 receives a lowest resolution feature map of the different resolution feature maps generated by the backbone 102 and the second feature map from the hierarchical attention module 108 and processes the lowest resolution feature map and the second feature map to predict a two-dimensional (2D) offset for every foreground point (e.g. for points which belong to vehicles, pedestrians, cyclist, etc.) in the range image r (265). The 2D offsets predicted by the instance decoder 106 are offsets that can shift a particular point in the range image r from its position to an object centroid on xy plane.

Figure 10:
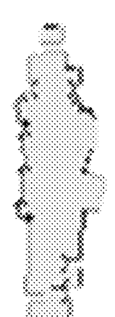
Figure 10:
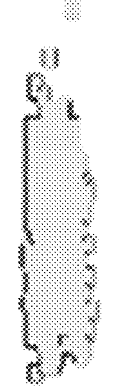
Figure 10:
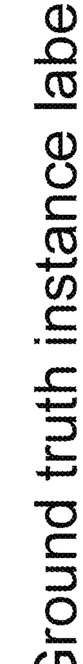
Figure 10:
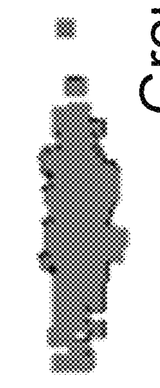
Figure 10:
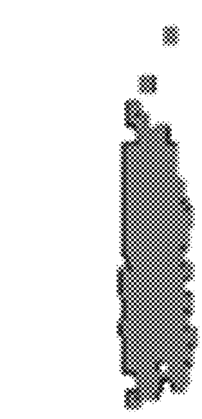

The cluster-free instance segmentation module 110, according to a first embodiment of the present disclosure, receives the predicted semantic labels from the semantic decoder 104, the predicted 2D offset on xy plane for every foreground point from the instance decoder 106, the original coordinate map c (N, 2) on the xy plane, and segments the foreground points of the points in the point cloud 114 that are projected into the range image r into different instances, where N is the number of foreground points of the point cloud 114 that are projected into range image r. In a first embodiment, the cluster-free instance segmentation module 110 filters the range image r using predicted semantic labels received from the semantic decoder 104 so that only foreground points remain (270). C is the filtered point cloud with its original xy coordinates. C has a shape of (N, 2), where N is the number of foreground points. The point embedding, C_s, is obtained when applying the predicted 2D offsets received from the instance decoder 106 to C (275). In particular, C_s=C−O. $C_s$ is pillarized such that points within ($d_x$, $d_y$) are grouped together. $d_x$ and $d_y$ are the grid size in x and y axis respectively (as shown in FIG. 10) (280). The embedding of each pillar is the average embedding of the points being grouped together inside the same grid. The pillarized point cloud $C_D$ has a shape of (M, 2), where M is the number of pillars.

While, in this embodiment, the foreground points in the point cloud are divided into pillars (that is, voxels that are unlimited in length along one dimension), the points can be divided into other forms of discrete spaces in other embodiments. For example, the points can be divided into voxels having discrete dimensions along three axes.

The cluster-free instance segmentation module 110 then constructs a pairwise distance matrix D, where each entry $D_{ij}=e^{-a\|C_{D,i}-C_{D,j}\|_2}$, where a is a tunable hyperparameter of the cluster-free instance segmentation module 110 (290). Then instances are segmented by finding connected pillars using the pairwise distance matrix (295).

Figure 7:
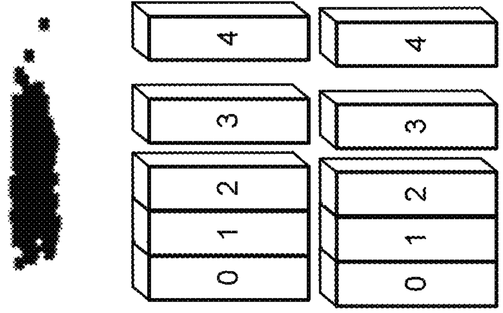
FIG. 7 shows various outputs generated by the cluster-free instance segmentation module of FIG. 2 in accordance with a configuration.
Figure 7:

FIG. 7 shows of the various outputs generated by the cluster-free instance segmentation module 110 when performing the above-noted operations. For example, the cluster-free instance segmentation module 110 generates a foreground point embedding (which is shown at the top of FIG. 7) and a pillarized embedding (which is shown at the bottom of FIG. 7).

Figure 8:
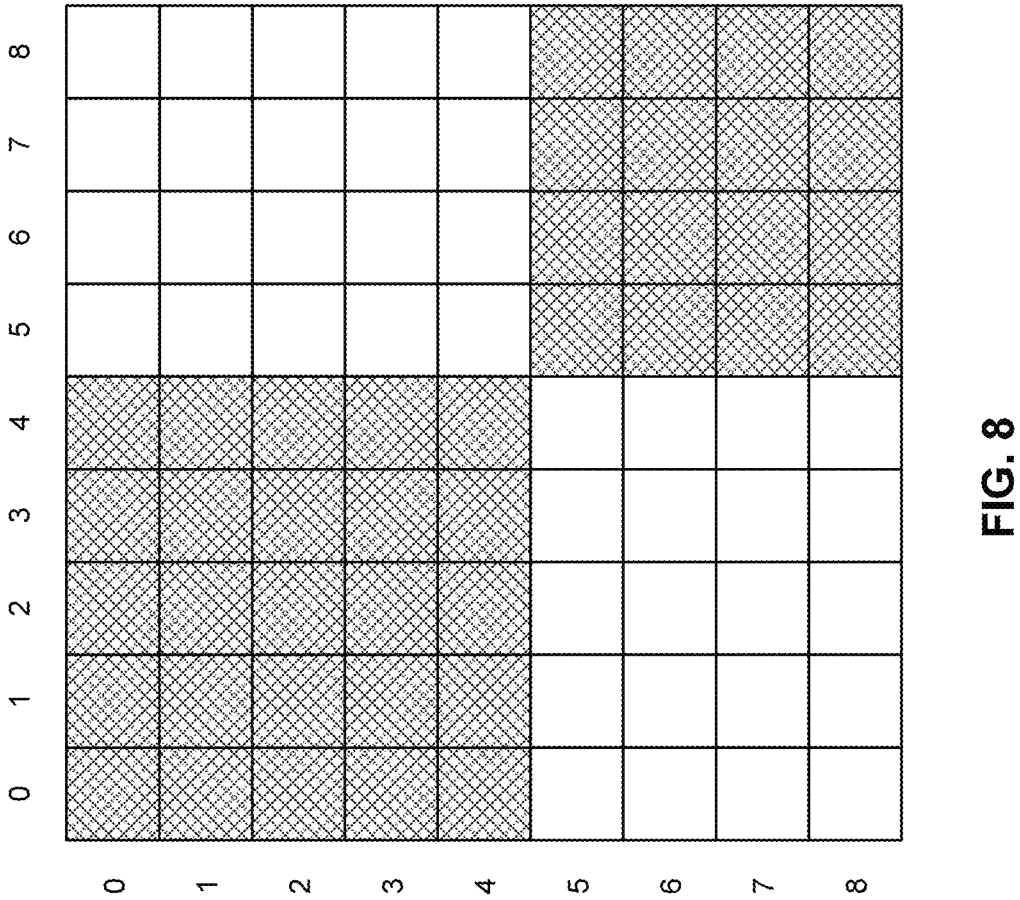
FIG. 8 shows a prediction matrix generated by the cluster-free instance segmentation module of FIG. 2.

During training of the system 100, the goal of the cluster-free instance segmentation module 110 is to supervise binary segmentation on matrix D via binary cross entropy loss and Lovasz Softmax. The predicted matrix, shown in FIG. 8, is acquired from constructing a pairwise comparison matrix of each pillar's instance label, assuming points inside the same pillar belong to the same instance of an object, and is compared to the ground truth matrix to compute loss. A filled box indicates that two pillars should be connected while an unfilled box indicates that two pillars do not belong to the same instance of an object.

During inference, the entry (i, j) in matrix D is interpreted in the following way. A score above 0.5 indicates pillar i and pillar j belong to the same object instance, and a score below 0.5 indicates they do not. The cluster-free instance segmentation module 110 uses a simple algorithm to find connected pillars in this matrix D to predict instance labels for every points in the range image r.

The cluster-free instance segmentation module 110, according to a second embodiment of the present disclosure, receives the original coordinate map c (N, 3) in the 3D space and its learned offset towards the instance centroid O (N, 3) and segments each point in the range image r into different object instances, where N is the number of foreground points in the range image r. In the second embodiment, the cluster-free instance segmentation module 110 filters the range image r using the predicted semantic labels provided by the semantic decoder 104 such that only foreground points remain. C is the filtered point cloud with its original xyz coordinates. C has a shape of (N, 3), where N is the number of foreground points. The point embedding, $C_s$, is obtained when applying the learned 3D offset from the instance decoder 106 to C. In particular, $C_s$=C−O. $C_s$ is voxelized such that points within ($d_x$, $d_y$, $d_z$) are grouped together. $d_x$, $d_y$ and $d_z$ are the grid size in x, y, and z axis respectively. The embedding of each voxel is the average embedding of the points being grouped together inside the same grid. The voxelized point cloud $C_D$ has a shape of (M, 3), where M is the number of voxels. A pairwise distance matrix D is constructed, where each entry $D_{ij}=e^{-a\|C_{D,i}-C_{D,j}\|_2}$, where a is a tunable hyperparameter. Then instances are segmented by finding connected voxels using the pairwise distance matrix.

During training, the goal is to supervise the binary segmentation on matrix D via binary cross entropy loss and Lovasz Softmax. The ground truth matrix can be acquired from constructing a pairwise comparison matrix of each voxel's instance label, assuming points inside the same voxel belong to the same instance.

During inference, the entry (i, j) in matrix D can be interpreted in the following way. A score above 0.5 indicates voxel i and voxel j belong to the same object instance, and a score below 0.5 indicates they do not. The cluster-free instance segmentation module 110 uses a simple algorithm to find connected voxels in matrix D obtain predicted instance labels.

The second embodiment of the cluster-free instance segmentation module 100 is capable of handling edge cases where there are different objects stacked on top of each other.

Figure 9:
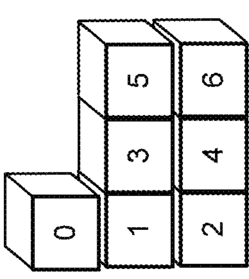
FIGS. 9 and 10 show point embedding and ground truth performed by the system of FIG. 2 and ground truth.
Figure 9:
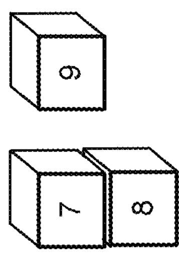
Figure 9:
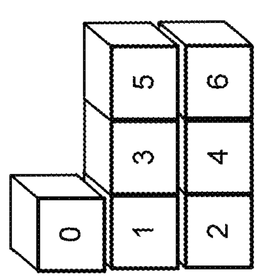

The cluster-free instance segmentation module 110, according to a third embodiment of the present disclosure, receives the original coordinate map c (N, 3) in the 3D space and its learned offset towards the instance centroid O (N, 3) and segments points in the range image r into different object instances, where N is the number of foreground points in the range image r. In the third embodiment, the cluster-free instance segmentation module 110 filters the point cloud using the predicted semantic labels received from the semantic decoder such that only foreground points remain. C is the filtered point cloud with its original xyz coordinates. C has a shape of (N, 3), where N is the number of foreground points. The point embedding, $C_s$, is obtained when applying the learned 3D offset from the instance decoder 106 to C. In particular, $C_s=C-O$. The voxelization/pillarization operation of the first embodiment is eliminated. $C_D=C_S$. Point embedding and ground truth are as shown in FIG. 9. A pairwise distance matrix D is constructed, where each entry $D_{ij}=e^{-a\|C_{D,i}-C_{D,j}\|_2}$, and a is a tunable hyperparameter of the cluster-free segmentation module. Then instances are segmented by finding connected voxels/pillars using the pairwise distance matrix.

During training, the goal is to supervise the binary segmentation on matrix D via binary cross entropy loss and Lovasz Softmax. The ground truth matrix is acquired by constructing a pairwise comparison matrix of each voxel's instance label, assuming points inside the same voxel belong to the same object instance.

During inference, the entry (i, j) in matrix D is interpreted in the following way. A score above 0.5 indicates point i and point j belong to the same object instance, and a score below 0.5 indicates they do not. The cluster-free instance segmentation module 110 uses a simple algorithm to find connected points in this matrix D to predict instance labels for every point in the range image r.

It is noted that performing a voxelization or pillarization operation on the point cloud 114 may result in points from different objects being assigned to the same voxel/pillar. Points within the same voxel/pillar may be assigned same instance label, which may lead to wrong instance label prediction for the points within the same voxel/pillar. Elimination of the voxelization or pillarization operation performed by the cluster-free instance segmentation module 110 avoids this issue, however, this also implies more computing resources are required to perform the operations of the cluster-free instance segmentation module 110 because point-wise comparison requires many more computing resources than the voxelization or pillarization operation.

The fusion module 112 receives the predicted instance labels from the cluster-free instance segmentations module 110, which is in the dimension of a range image, projects the semantic and instance labels back to the point cloud 114 (296). At the same time, KNN is used to post-process the output as the points very close to each other in the 3D space are refined to obtain a consistent instance and semantic labels.

In some embodiments, the system 100 may include a post-processing module (not shown) which resolves conflicts between predicted semantic labels and predicted instance label for the points in range image r (297). When different points are assigned same instance label but different semantic labels, a majority voting scheme is used to refine the predicted semantic labels for the points with the same instance label.

The system 100 of the present disclosure uses local 3D geometry during the downsampling of the range image r to feature maps of different resolution. Further, the system 100 of the present disclosure does not perform clustering which is both time-consuming and resource consuming (i.e. is a process which requires significant computing resources a (processing and memory resources) and time to perform). Thus, the system of the present disclosure is able to perform panoptic segmentation in less than 100 milliseconds, which is considered achieving real-time performance. Further, hierarchical attention module 108 of the system 100 fuse (i.e. combines) features maps of different resolutions and applies channel attention to the fused feature map to generate the first and second feature maps for the semantic and instance decoders, respectively. This ensures both the semantic and instances decoder receive meaningful features for their respective tasks (e.g. semantic segmentation and instance segmentation).

Figure 11:
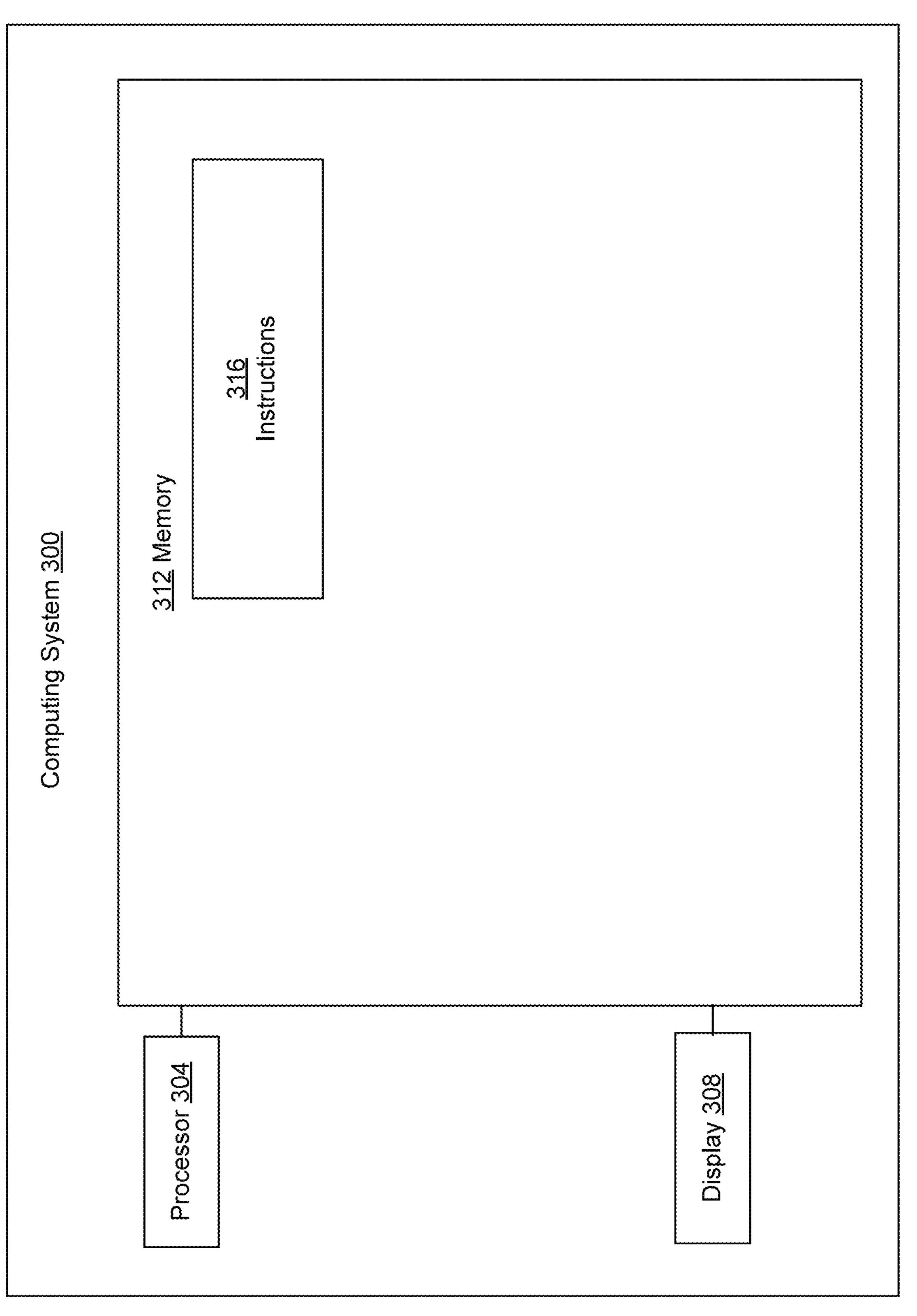
FIG. 11 is a schematic diagram showing various physical and logical elements of a computing device for proposal-free and cluster-free panoptic segmentation in accordance with an embodiment.

FIG. 11 shows various physical and logical components of an exemplary computing system 300 for proposal-free and cluster-free panoptic segmentation of point clouds in accordance with an embodiment of the present disclosure. Although an example embodiment of the computing system 300 is shown and discussed below, other embodiments may be used to implement examples disclosed herein, which may include components different from those shown. Although FIG. 11 shows a single instance of each component of the computing system 300, there may be multiple instances of each component shown. The example computing system 300 may be part of, or connected to, a device for monitoring systems for the elderly to provide a visual representation of the location of a person for which line-of-sight may not be available, such as in an indoor environment. Alternatively, the example computing system 300 may be part of, or connected to, a simultaneous localization and mapping (SLAM) system, such as for autonomous vehicles.

The computing system 100 includes one or more processors 304, such as a central processing unit, a microprocessor, an application-specific integrated circuit (ASIC), a field-programmable gate array (FPGA), a dedicated logic circuitry, a tensor processing unit, a neural processing unit, a dedicated artificial intelligence processing unit, or combinations thereof. The one or more processors 304 may collectively be referred to as a processor 304. The computing system 300 may include a display 308 for outputting data and/or information in some applications, but may not in some other applications.

The computing system 100 includes one or more memories 312 (collectively referred to as "memory 312"), which may include a volatile or non-volatile memory (e.g., a flash memory, a random access memory (RAM), and/or a read-only memory (ROM)). The non-transitory memory 312 may store machine-executable instructions for execution by the processor 304. A set of machine-executable instructions 316 for proposal-free and cluster-free panoptic segmentation of point clouds (described herein) is shown stored in the memory 312, which may be executed by the processor 304 to perform the steps of the methods for training and using the system 100 for proposal-free and cluster-free panoptic segmentation of point clouds described herein. The memory 312 may include other machine-executable instructions for execution by the processor 304, such as machine-executable instructions for implementing an operating system and other applications or functions.

The memory 308 may also store data, information, rules, policies, and machine-executable instructions described herein.

In some examples, the computing system 300 may also include one or more electronic storage units (not shown), such as a solid state drive, a hard disk drive, a magnetic disk drive and/or an optical disk drive. In some examples, one or more datasets and/or modules may be provided by an external memory (e.g., an external drive in wired or wireless communication with the computing system 300) or may be provided by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage. The storage units and/or external memory may be used in conjunction with memory 312 to implement data storage, retrieval, and caching functions of the computing system 300.

The components of the computing system 300 may communicate with each other via a bus, for example. In some embodiments, the computing system 300 is a distributed computing system and may include multiple computing devices in communication with each other over a network, as well as optionally one or more additional components. The various operations described herein may be performed by different computing devices of a distributed system in some embodiments. In some embodiments, the computing system 300 is a virtual machine provided by a cloud computing platform.

Although the components for both training and using the system 100 are shown as part of the computing system 300, it will be understood that separate computing devices can be used for training and using the system 100 for proposal-free and cluster-free panoptic segmentation of point clouds.

The steps (also referred to as operations) in the flowcharts and drawings described herein are for purposes of example only. There may be many variations to these steps/operations without departing from the teachings of the present disclosure. For instance, the steps may be performed in a differing order, or steps may be added, deleted, or modified, as appropriate.

In other embodiments, the same approach described herein can be employed for other modalities.

Through the descriptions of the preceding embodiments, the present invention may be implemented by using hardware only, or by using software and a necessary universal hardware platform, or by a combination of hardware and software. The coding of software for carrying out the above-described methods described is within the scope of a person of ordinary skill in the art having regard to the present disclosure. Based on such understandings, the technical solution of the present invention may be embodied in the form of a software product. The software product may be stored in a non-volatile or non-transitory storage medium, which can be an optical storage medium, flash drive or hard disk. The software product includes a number of instructions that enable a computing device (personal computer, server, or network device) to execute the methods provided in the embodiments of the present disclosure.

All values and sub-ranges within disclosed ranges are also disclosed. Also, although the systems, devices and processes disclosed and shown herein may comprise a specific plurality of elements, the systems, devices and assemblies may be modified to comprise additional or fewer of such elements. Although several example embodiments are described herein, modifications, adaptations, and other implementations are possible. For example, substitutions, additions, or modifications may be made to the elements illustrated in the drawings, and the example methods described herein may be modified by substituting, reordering, or adding steps to the disclosed methods.

Features from one or more of the above-described embodiments may be selected to create alternate embodiments comprised of a sub-combination of features which may not be explicitly described above. In addition, features from one or more of the above-described embodiments may be selected and combined to create alternate embodiments comprised of a combination of features which may not be explicitly described above. Features suitable for such combinations and sub-combinations would be readily apparent to persons skilled in the art upon review of the present disclosure as a whole.

In addition, numerous specific details are set forth to provide a thorough understanding of the example embodiments described herein. It will, however, be understood by those of ordinary skill in the art that the example embodiments described herein may be practiced without these specific details. Furthermore, well-known methods, procedures, and elements have not been described in detail so as not to obscure the example embodiments described herein. The subject matter described herein and in the recited claims intends to cover and embrace all suitable changes in technology.

Although the present invention and its advantages have been described in detail, it should be understood that various changes, substitutions and alterations can be made herein without departing from the invention as defined by the appended claims.

The present invention may be embodied in other specific forms without departing from the subject matter of the claims. The described example embodiments are to be considered in all respects as being only illustrative and not restrictive. The present disclosure intends to cover and embrace all suitable changes in technology. The scope of the present disclosure is, therefore, described by the appended claims rather than by the foregoing description. The scope of the claims should not be limited by the embodiments set forth in the examples, but should be given the broadest interpretation consistent with the description as a whole.

The invention claimed is:

1. A computer-implemented method for panoptic segmentation of a point cloud, comprising:

projecting a point cloud into a range image;

extracting features from the range image and generating a feature map from the extracted features;

downsampling the feature map and scaling the features during downsampling using local geometry;

extracting features from the downsampled feature map;

semantically segmenting the point cloud at least partially based on the features extracted; and segmenting instances in the point cloud at least partially based on the features extracted.

2. The computer-implemented method of claim 1, wherein the downsampling and the extracting features from the downsampled feature map are repeated.

3. The computer-implemented method of any of the previous claims, wherein the extracted features are grouped into channels.

4. The computer-implemented method of claim 3, further comprising:

weighing the features in each of the channels differently for semantic segmentation and instance segmentation.

5. The computer-implemented method of claim 1, wherein points in the point cloud are assigned semantic labels and instance labels during the semantic segmenting and the instance segmenting, respectively, and wherein the semantic labels and the instance labels are projected onto the point cloud.

6. The computer-implemented method of claim 1, further comprising:

upsampling the downsampled feature map to a desired resolution; and processing combined features of the feature map and the downsampled feature map at the desired resolution before the semantically segmenting and the segmenting instances.

7. The computer-implemented method of claim 6, wherein the desired resolution is the resolution of the feature map.

8. The computer-implemented method of claim 6, wherein the features of the feature map and the downsampled feature map are assigned to feature channels.

9. The computer-implemented method of claim 8, wherein the processing includes:

semantically segmenting the point cloud using a first set of weights for the feature channels; and segmenting instances in the point cloud using a second set of weights for the feature channels, the second set of weights differing from the first set of weights.

10. The computer-implemented method of claim 1, further comprising:

dividing foreground points in the point cloud into discrete spaces;

determining a center of mass for each of the discrete spaces based on a position of the foreground points in the discrete space;

determining a distance between the centers of mass of pairs of discrete spaces;

calculating a score for each of the pairs of discrete spaces at least partially based on the distance between the centers of mass of the discrete spaces in the pair; and grouping the foreground points in each discrete space into objects based on the score for each of the pairs of discrete spaces.

11. The computer-implemented method of claim 10, further comprising:

determining the position for each foreground point in the point cloud based on a shifted position from a centroid of an instance to which the point belongs.

12. The computer-implemented method of claim 10, wherein the discrete spaces are voxels.

13. The computer-implemented method of claim 12, wherein the voxels are unlimited in length along a dimension.

14. The computer-implemented method of claim 10, further comprising:

constructing a pairwise distance matrix wherein each matrix element represents the distance between one of the pairs of discrete spaces.

15. The computer-implemented method of claim 10, wherein the score, $D_{ij}$, is calculated as:

$$D_{ij} = e^{-a\|C_{D,i}-C_{D,j}\|_2},$$

where $\|C_{D,i}-C_{D,j}\|_2$ is the distance between the discrete spaces $C_{D,i}$ and $C_{D,j}$, and a is a tunable hyperparameter.

16. A computing system for panoptic segmentation of a point cloud, the computing system comprising:

a processor;

a memory storing machine-executable instructions that, when executed by the processor, cause the processor to:

project a point cloud into a range image;

extract features from the range image and generating a feature map from the extracted features;

downsample the feature map and scaling the features during downsampling using local geometry;

extract features from the downsampled feature map;

semantically segment the point cloud at least partially based on the features extracted; and segment instances in the point cloud at least partially based on the features extracted.

17. The computing system of claim 16, wherein the machine-executable instructions, when executed by the processor, cause the processor to repeat the downsampling and the extraction of features from the downsampled feature map.

18. The computing system of claim 16, wherein the extracted features are grouped into channels, and wherein the machine-executable instructions, when executed by the processor, cause the processor to:

weigh the features in each of the channels differently for semantic segmentation and instance segmentation.

19. The computing system of claim 16, wherein points in the point cloud are assigned semantic labels and instance labels during the semantic segmenting and the instance segmenting, respectively, and wherein the semantic labels and the instance labels are projected onto the point cloud.

20. The computing system of claim 16, wherein the machine-executable instructions, when executed by the processor, cause the processor to:

upsample the downsampled feature map to a desired resolution; and process combined features of the feature map and the downsampled feature map at the desired resolution before the semantically segmenting and the segmenting instances.

* * * * *